United States Patent [19]

Strickland

[11] 4,226,103
[45] Oct. 7, 1980

[54] LOCKING DEVICE FOR GLAD HAND BRAKE LINE COUPLERS

[76] Inventor: Ray M. Strickland, Box Dy 146, Cave Creek Stage, Phoenix, Ariz. 85020

[21] Appl. No.: 939,458

[22] Filed: Sep. 5, 1978

[51] Int. Cl.² .................................. E05B 65/14
[52] U.S. Cl. .................................. 70/237; 70/14; 70/57
[58] Field of Search .......... 70/57, 14, 237, 163, 70/166–169; 303/89; 138/109; 285/80, DIG. 2; 280/507

[56] References Cited

U.S. PATENT DOCUMENTS

| | | | |
|---|---|---|---|
| 3,004,421 | 10/1961 | Bowler | 70/14 X |
| 3,226,133 | 12/1965 | Geresy | 70/237 X |
| 3,631,896 | 1/1972 | Meiss | 70/14 |
| 3,880,477 | 4/1975 | Stevenson et al. | 303/89 |

Primary Examiner—William E. Lyddane
Attorney, Agent, or Firm—Cahill, Sutton & Thomas

[57] ABSTRACT

A locking device engageable in mating relationship with a glad hand brake line coupler of a semi-trailer disconnected from its tractor is disclosed. A depressible lock mechanism supported by a housing of the locking device is connected to a plunger which is extended into an air passage opening in a heavy rubber grommet of the glad hand coupler when the lock mechanism is depressed. Once the plunger is extended, it can only be retracted by means of a key which unlocks the depressible lock mechanism. When the locking device is matingly engaged with the glad hand coupler, it is prevented from vertical displacement from the glad hand connector by engagement of tongues and corresponding tongue receiving recesses of the glad hand and the locking device. The locking device is prevented from lateral or rotational displacement with respect to the glad hand coupler by the engagement of the plunger with the inside walls of the air passage opening in the rubber grommet.

7 Claims, 5 Drawing Figures

LOCKING DEVICE FOR GLAD HAND BRAKE LINE COUPLERS

BACKGROUND OF THE INVENTION

1. Field of the Invention

The invention relates to locking devices for glad hand air brake systems for trailers.

2. Description of the Prior Art

Frequently truck drivers need to temporarily disconnect their tractors from the semi-trailers which carry cargo. The tractors and trailers almost universally utilize air brake systems. The air hoses from the trailer brake system and the tractor brake system almost universally are coupled together by means of glad hand couplers. Ordinarily, one glad hand coupler is rigidly connected to the frame of the tractor and a substantially identical glad hand coupler is connected to an air hose extending from the trailer brake system. When the two glad hand couplers are mated, a leak-free path exists between the air hoses of the truck and trailer braking system, so that high pressure (typically 90 to 120 pounds per square inch) is maintained in the systems of both the tractor and trailer. The brake mechanisms of the trailer are designed so that the trailer brakes are fully applied when there is no air pressure in the trailer brake lines (the brakes are partially or fully engaged by partial or full release of such air pressure in the brake system). Consequently, the trailer cannot be moved until the glad hand coupler of the trailer is coupled with the glad hand coupler of a tractor. However, since virtually all tractors have glad hand couplers, anyone having a tractor can merely connect it to a parked trailer, couple the glad hand coupler to that of the parked trailer, and tow it away. Pirating of parked trailers temporarily disconnected from a tractor is surprisingly commonplace. Sometimes outright theft of the trailer and its cargo occurs by "pirates". Occasionally, a shipping company by whom a truck driver is employed will realize that the truck driver is somewhat behind schedule and will send another driver (who happens to be in the vicinity of the first driver's temporarily parked trailer) to hitch a tractor to the parked trailer and finish the "haul". Then the original driver does not get paid for the remainder of the haul. This practice is strongly objected to by truck drivers, who consequently usually guard their trailers and cargoes quite carefully. It would be very helpful to truck drivers if a simple yet reliable means of locking temporarily parked cargo trailers which prevent pirates and others from removing temporarily parked cargo trailers were available at a reasonable cost.

A novelty search directed to the present invention uncovered U.S. Pat. Nos. 3,884,055; 4,039,202; 3,944,295; 3,977,221; 3,973,805 and 3,880,477. The above patents disclose the general concept of providing locking devices which prevent connecting a tractor to a trailer. However, the disclosed systems are rather elaborate, some of them involving permanently installed, complicated, and often heavy locking devices. However, none disclose a locking device for use in conjunction with glad hand brake line couplers. Other patents uncovered by this search include U.S. Pat. Nos. 2,048,353; 3,240,537; 3,285,672; and 3,674,321 disclosing various devices used in conjunction with latching or coupling systems.

SUMMARY OF THE INVENTION

Briefly described, and in accordance with one embodiment thereof, the invention provides a locking device for a glad hand brake line coupler connected to a parked trailer having an air brake system. The locking device includes an extendible and retractable plunger extendible into an air passage opening of the glad hand coupler. The plunger is connected to a locking mechanism which prevents the plunger from being retracted from the air passage by a thief or tamperer without unlocking the locking mechanism. The locking device further includes an extending tongue for insertion into a confining tongue-receiving recess of the glad hand coupler and also includes a tongue-receiving opening for receiving and restraining rotational or linear movement of the locking device with respect to the glad hand coupler when the plunger is extended into the air passage opening. Thus, the locking device can be matingly engaged with the glad hand coupler, thereby preventing connection of a corresponding glad handler coupler of the parked trailer. The brake system therefore remains fully applied (in the absence of air pressure coupled to the brake trailer system by means of the glad hand coupler), thereby preventing unauthorized movement of the trailer.

DESCRIPTION OF THE INVENTION

Figure 1:
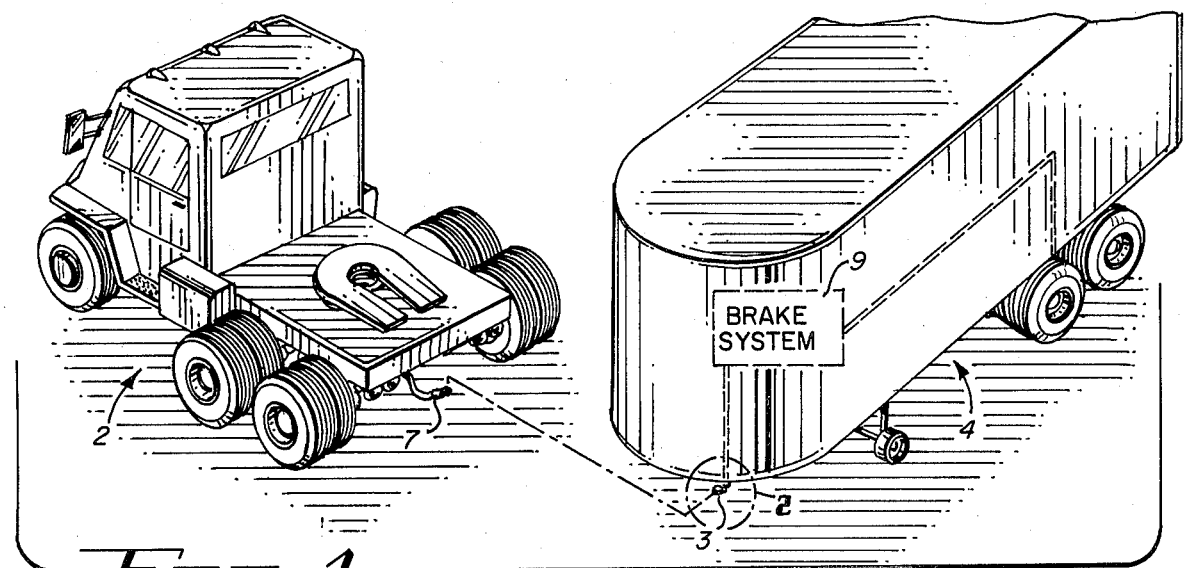
FIG. 1 is a perspective view illustrating an environment in which the locking device of the present invention is utilized.

The locking device of the present invention can be best understood by first briefly describing the environment in which the locking device operates. Referring to FIG. 1, a diesel tractor 2 having an air brake system has a glad hand coupler 7 attached thereto by means of a flexible air hose. A car load trailer 4 has a brake system designated by reference numeral 9. The brake system 9 is connected to a glad hand coupler 3 rigidly attached to trailer 4. Glad hand coupler 3 is substantially identical to glad hand coupler 7. The brake system includes mechanisms located on the axles of the trailers for applying maximum pressure to the brake drums for each wheel when there is no air pressure in line 5. When glad hand couplers 3 and 7 are coupled togetger and the air pressure system of tractor 2 is operating, the air pressure in line 5 causes the trailer brakes to disengage. The brakes are selectively applied and disengaged by selective release of pressure in the air brake system in response to a brake pedal value in the driver's compartment of tractor 2.

The locking device of the present invention can be securely connected to glad hand coupler 3 of FIG. 1, thereby preventing unauthorized connection of brake line 5 of trailer 4 to the brake line system of tractor 2.

Figure 2:
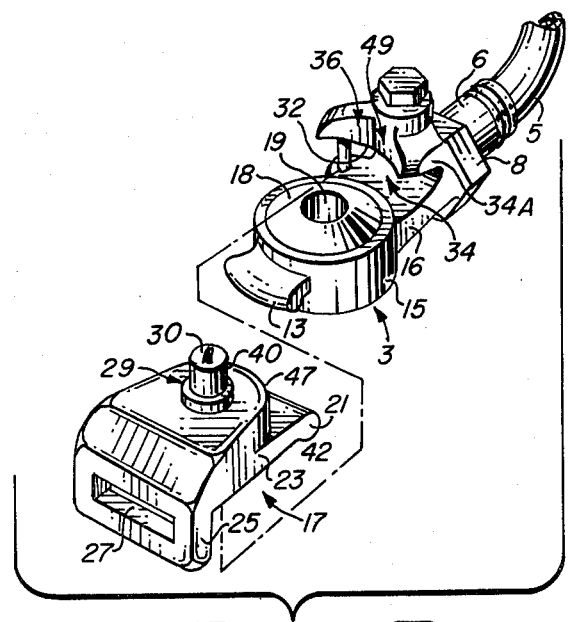
FIG. 2 is a perspective diagram showing the described locking device of the present invention and a glad hand brake line connector to which the locking device can be locked.

Referring now to FIG. 2, the details of glad hand coupler 3 are more clearly shown. More specifically, glad hand coupler 3 includes a housing 15 having a tongue 13 extending from one side thereof and a support plate or member 16 extending from the side of housing 15 opposite tongue 13. A hose receiving end 8 is connected to support plate 16 for receiving an air hose connector 6, which is connected to flexible air hose 5. An air passage (not shown) extends through end 8 and support member 16 into a chamber of housing 15, which chamber tightly accommodates rubber grommet 18. Rubber grommet 18 has an air passage opening 19 which extends to meet the above mentioned air passage.

Glad hand coupler 3 has a tongue-receiving opening 34 bounded by a ridge member 36 and a stop 32. Thus, an identical glad hand coupler, such as glad hand coupler 17 of tractor 2 in FIG. 1, can be engaged with glad hand coupler 3 by inserting the tongue of each glad hand coupler into the open end 34A of the tongue receiving recess of the other glad hand coupler and rotating the two glad hand couplers in opposite directions until the tongue of each engages the stop of the other. This aligns the openings in the rubber grommets of each glad hand coupler, and forces the exposed outer surfaces of the rubber grommets of the two glad hand couplers tightly together to form an airtight seal. Glad hand connectors of the type disclosed in FIG. 2 are manufactured by companies such as Berg Corporation, Vevac Corporation, and Bendix-Westinghouse Corporation.

Still referring to FIG. 2, the locking device 17 of the invention includes a housing 23 which has a tongue 21 extending therefrom. At the opposite end of housing 23, a flange 25 extends downward vertically from lower surface 42 of locking device 17. Flange 25 has a tongue receiving opening 27 for receiving tongue 13 of glad hand coupler 3. Tongue 21 of locking device 17 is inserted into tongue receiving recess 34 of glad hand coupler 3.

Locking device 17 includes a lock assembly 29 centrally mounted therein. Referring now to FIGS. 2-5, lock assembly 29 has a depressible barrel lock mechanism 40 having a keyhole 30 therein for receiving a key to unlock the lock assembly.

A plunger 38 having an outside diameter somewhat smaller than the diameter of opening 19 in rubber grommet 18 is attached to depressible lock barrel assembly 40. Thus, when locking device 17 is positioned in mating relationship with glad hand coupler 3 that tongue 13 extends through tongue receiving opening 27 of locking device 17, tongue 21 of locking device 17 extends into tongue receiving recess 34 of glad hand connector 3, and plunger 38 is aligned over opening 19 of rubber grommet 18.

When depressible lock barrel mechanism 40 is depressed, plunger 38 then extends into opening 19, preventing removal of locking device 17 from glad hand connector 15.

Figure 3:
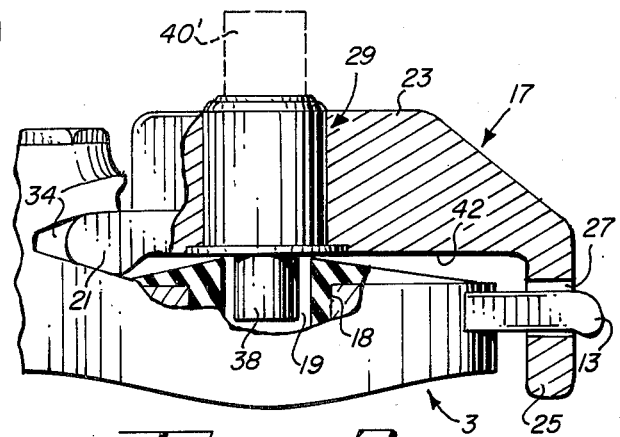
FIG. 3 is a sectional diagram of the locking device of FIG. 2.

The diagram of FIG. 3 illustrates how tongue 21 of locking device 17 fits into tongue receiving recess 34 of glad hand coupler 3 and how tongue 13 of glad hand coupler 3 fits into tongue receiving hole 27 of flange 25 of locking device 17. Reference numeral 40' indicates a dotted line representing the un-depressed configuration of lock barrel mechanism 40. However, the lock barrel mechanism is illustrated in its depressed configuration in FIG. 3, so that plunger 38 extends into air passage opening 19 of rubber grommet 18. Of course, when lock barrel mechanism 40 is not depressed, plunger 38 does not extend into opening 19, but instead has its lower end flush with lower surface 42 of locking device 17, so that locking device 17 can be easily removed from glad hand connector 3.

Figure 4:
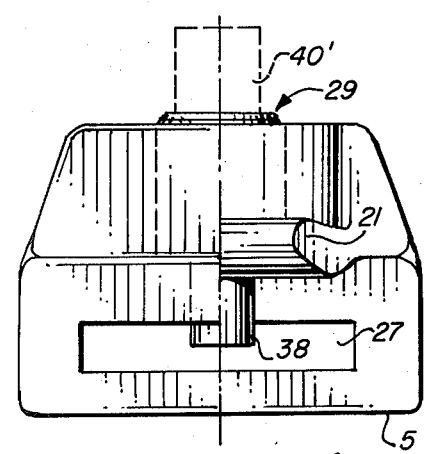
FIG. 4 is a diagram showing half end views of the front and rear ends of the locking device of FIG. 1.
Figure 5:
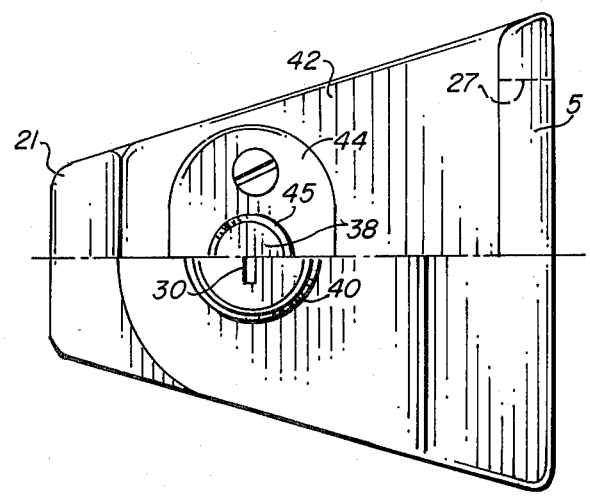
FIG. 5 is a diagram showing half top and half bottom views of the locking device of FIG. 2.

FIGS. 4 and 5 illustrate, respectively, partial end views and partial top and bottom views of locking device 17. For example, the upper portion of FIG. 5 illustrates a half bottom view of locking device 17, showing half of plunger 38 extending from an opening 45 in plate 44. Plate 44 is a mounting plate for lock assembly 29, and may be screwed into bottom surface 42 of housing 23, as indicated. Of course, other means of rigidly attaching locking device 29 to housing 23 or integrating locking device 29 into housing 23 may be provided by those skilled in the art.

A noteworthy feature of housing 23 is the curved front surface 47, which has a curvature designed to engage or be encompassed by the curved forward surface 49 of glad hand coupler 3. The close fit between curved surface 47 and curved surface 49 when locking device 17 is matingly engaged with and locked to glad hand coupler 3 helps to resist rotation of locking device 17 with respect to glad hand connector 3, thereby improving the security of locking device 17.

The details of locking mechanism 29 are well known to those skilled in the art, and need not be provided in detail here. For example, a locking device similar to part No. 1001 manufactured by Hudson Lock Manufacturing Co. could be utilized. The housing 23, tongue 21, and flange 25 can all be integrally cast from tempered aluminum, iron, steel or any other suitably strong material.

The present invention provides an economical, lightweight and highly secure locking device which can be utilized to prevent unauthorized removal of parked cargo trailers. It would be very difficult to remove the glad hand coupler locking device of the present invention from a glad hand coupler of a trailer without damaging the glad hand coupler. This would undoubtedly produce leakage in the air pressure lines, preventing the brakes of the trailer from being disengaged and thereby preventing removal of the trailer.

While the invention has been described with reference to a particular embodiment thereof, those skilled in the art will readily recognize that variations in arrangement of elements to provide the desired result may be made without departing from the true spirit and scope of the present invention.

I claim:

1. A locking device for locking engagement with a trailer brake line coupler having a tongue, a tongue-receiving recess and a seal with an air passage opening therein, said locking device comprising in combination:
   a. a housing having a lower surface and an upper surface;
   b. a tongue extending outward from said housing for insertion into said tongue-receiving recess of said brake line connector;
   c. a flange attached to said housing extending outwardly from said lower surface, said flange having a tongue-receiving opening for receiving said tongue of said brake line connector; and
   d. a lock mechanism mounted in said housing, said lock mechanism having an extendible plunger extendible outward from said lower surface into said air passage opening, said plunger being retractable by unlocking said locking device, said tongue of said housing extending into said tongue-receiving recess and said tongue of said brake line connector extending into said tongue receiving opening when said extendible plunger extends into said air passage opening;

whereby, said locking device is not removable from said brake line coupler when said extendible plunger extends into said air passage opening without damaging said locking device and/or said brake line connector.

2. The locking device of claim 1 wherein said lock mechanism includes a depressible lock barrel mechanism coupled to said plunger for extending said plunger into said air passage opening when said depressible lock barrel mechanism is depressed and retracting said plunger from said air passage opening when said depressible lock barrel mechanism is unlocked.

3. The locking device of claim 2 wherein said flange and said tongue are integrally formed with said housing.

4. The locking device of claim 3 wherein said housing, said flange, and said tongue are made of cast aluminum.

5. The locking device of claim 3 wherein said housing, said flange, and said tongue are made of steel.

6. The locking device of claim 1 wherein said brake line coupler is a glad hand coupler.

7. The locking device of claim 6 wherein said glad hand coupler has a curved ridge bounding said tongue-receiving recess of said brake line coupler, wherein said housing of said locking device includes a curved surface which mates with said curved ridge to help prevent rotational movement of said locking device with respect to said brake line coupler when said locking device is in locking engagement with said brake line coupler.

* * * * *